United States Patent [19]
Pritchard

[11] Patent Number: 5,186,417
[45] Date of Patent: Feb. 16, 1993

[54] AIRCRAFT CARGO CONTROL SYSTEM

[75] Inventor: Robert J. Pritchard, Lansdale, Pa.

[73] Assignee: Teleflex Incorporated, Limerick, Pa.

[21] Appl. No.: 695,567

[22] Filed: May 3, 1991

[51] Int. Cl.$^5$ .............................................. B65G 43/08
[52] U.S. Cl. .............................. 244/137.1; 198/464.2; 198/572; 198/781; 198/783
[58] Field of Search ................... 198/782, 781, 464.2, 198/572, 792, 783; 244/137.1

[56] References Cited

U.S. PATENT DOCUMENTS

| | | | |
|---|---|---|---|
| 3,612,316 | 10/1971 | Baldwin et al. | 244/137.1 X |
| 3,741,504 | 6/1973 | Alberti et al. | 244/137.1 X |
| 3,756,544 | 9/1973 | Bader | 244/137.1 X |
| 4,453,627 | 6/1984 | Wilkins | 198/781 |
| 4,593,810 | 6/1986 | Cook | 198/782 X |
| 4,596,332 | 6/1986 | Gensike et al. | 198/572 X |
| 4,609,098 | 9/1986 | Morgan et al. | 198/781 |
| 5,058,727 | 10/1991 | Jahns et al. | 198/572 X |
| 5,060,785 | 10/1991 | Garrity | 198/783 X |
| 5,083,655 | 1/1992 | Becker | 198/572 X |
| 5,086,910 | 2/1992 | Terpstra | 198/782 X |

*Primary Examiner*—D. Glenn Dayoan
*Assistant Examiner*—Dean A. Reichard
*Attorney, Agent, or Firm*—Reising, Ethington, Barnard, Perry & Milton

[57] ABSTRACT

An aircraft cargo control system (12) controls powered rollers (24, 26) for moving pallets (28) in the cargo area of an aircraft (30). The control system (12) includes a joy stick (60) for controlling longitudinal movement on the right side (46), left side (48), or both sides, and lateral movement into and out of the aircraft (30). The motor (51) of each roller (24) includes a sensor (90) and switch (76) for sensing a pallet (28) thereover and powering the motor (51) only when a pallet (28) is sensed and the joy stick (60) is appropriately selected. Therefore, only powered rollers (24) moving the pallets (28) are powered, while the remaining rollers (24) remain unpowered.

28 Claims, 5 Drawing Sheets

# AIRCRAFT CARGO CONTROL SYSTEM

TECHNICAL FIELD

The invention relates to the control of a power driven conveyor assembly for accommodating freights on a freight carrier, and more particularly to a conveyor control for selectively powering rollers to move freight.

BACKGROUND ART

For the accommodations of freight and freight carrying aircraft, a lower deck and sometimes also an upper deck are fitted with a power driven system for loading freight supported on pallets into and out of the cargo areas. Typically, conveyor systems include a plurality of longitudinally extending roller trays rotatably supporting free roller conveyor wheels therein. At spaced intervals, power driven rollers are provided for engaging the roller surface of the pallet to move the pallet along the roller trays. These power driven rollers usually allow the roller to be raised and lowered relative to the lower surface of the pallet so that in the event of power failure, the power drive roller can be recessed to a retracted position and the freight moved along the roller trays.

Several systems have been utilized to control the power driven rollers. In a first system, a selector switch is provided and operatively connected to each of the power driven rollers. The selector switch is able to select a number of power driven rollers to be operated at a time. Available selection includes all power drive rollers on at one time, or all rollers on except for the last section. A second system operates all power driven rollers to be turned on and remain on until manually turned off. A third system powers all rollers. Upon latching of a pallet, the latch causes power to the roller to be discontinued. The power supply is routed through the latch and a switch therein, to motor. This will cause problems in recent developments wherein the latches are moveable within the freight carrier. This embodiment would require the wires to be moveable with the latches and avoid entanglement.

Another type of system is disclosed in U.S. Pat. No. 3,741,504, issued Jun. 26, 1973 in the name of Alberti et al. The patent discloses a cargo handling system utilizing free rollers and power drive wheels. The power driven wheels are activated all at one time and remain activated until manually disabled.

A problem with these prior art systems is that when rollers are activated under latched and stationary containers, wear occurs on the rollers located therebelow. Furthermore, power consumption of by all rollers operating at all times is undesirable.

SUMMARY OF THE INVENTION AND ADVANTAGES

An aircraft conveyor assembly for and the method of controlling movement of an object through an aircraft comprises a plurality of drive means spaced along an aircraft for receiving power to contact and move the object. The conveyor assembly is characterized by including control means operatively connected to the plurality of drive means for limiting power only to drive means adjacent the object to be moved while preventing power to the drive means, adjacent and moving the container.

The conveyor assembly may also be characterized by including control means for powering a predetermined number of drive means adjacent and moving a predetermined number of objects and for automatically discontinuing power to at least one of the power drive means in response to an additional object being placed adjacent an unpowered drive means.

Another feature of the invention includes control means operatively connected to the drive means for sensing the presence of an object at one of the drive means to supply the power thereto to move the object and for preventing power to the drive means in the absence of a object adjacent thereto.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
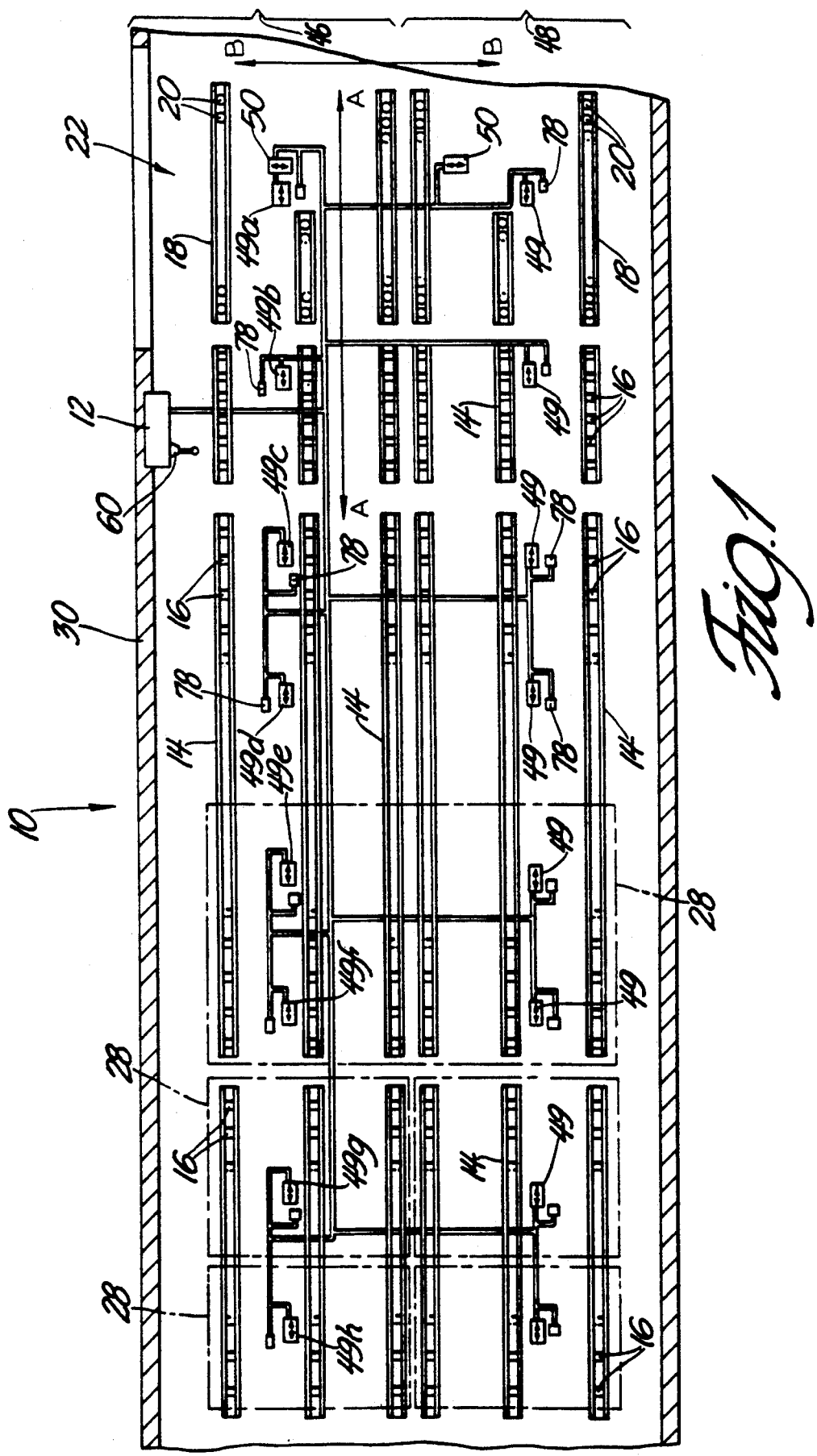
FIG. 1 is a plan view of a typical cargo area of an aircraft of the subject invention.

An aircraft conveyor assembly is generally indicated at 10 in FIG. 1. The conveyor assembly 10 includes a plurality of longitudinally extending conveyor trays 14 rotatably supporting free conveyor rollers or wheels 16. Also included are conveyor trays 18 for supporting omni-directional rollers 20 in the door area 22. At spaced intervals, a plurality of longitudinal 49 and lateral 50 drive means move pallets or objects 28 along the free rollers 16, 20. The longitudinal drive means 49 comprises powered longitudinal drive rollers 24 extending in the longitudinal direction A between roller trays 14. The lateral drive means 50 comprises powered lateral drive rollers (not shown) extending in the lateral direction B between roller trays 18 in the door area 22. The rollers 16, 20, 24 and 49 move objects or pallets 28 into and through the cargo area of the aircraft 30.

Figure 2:
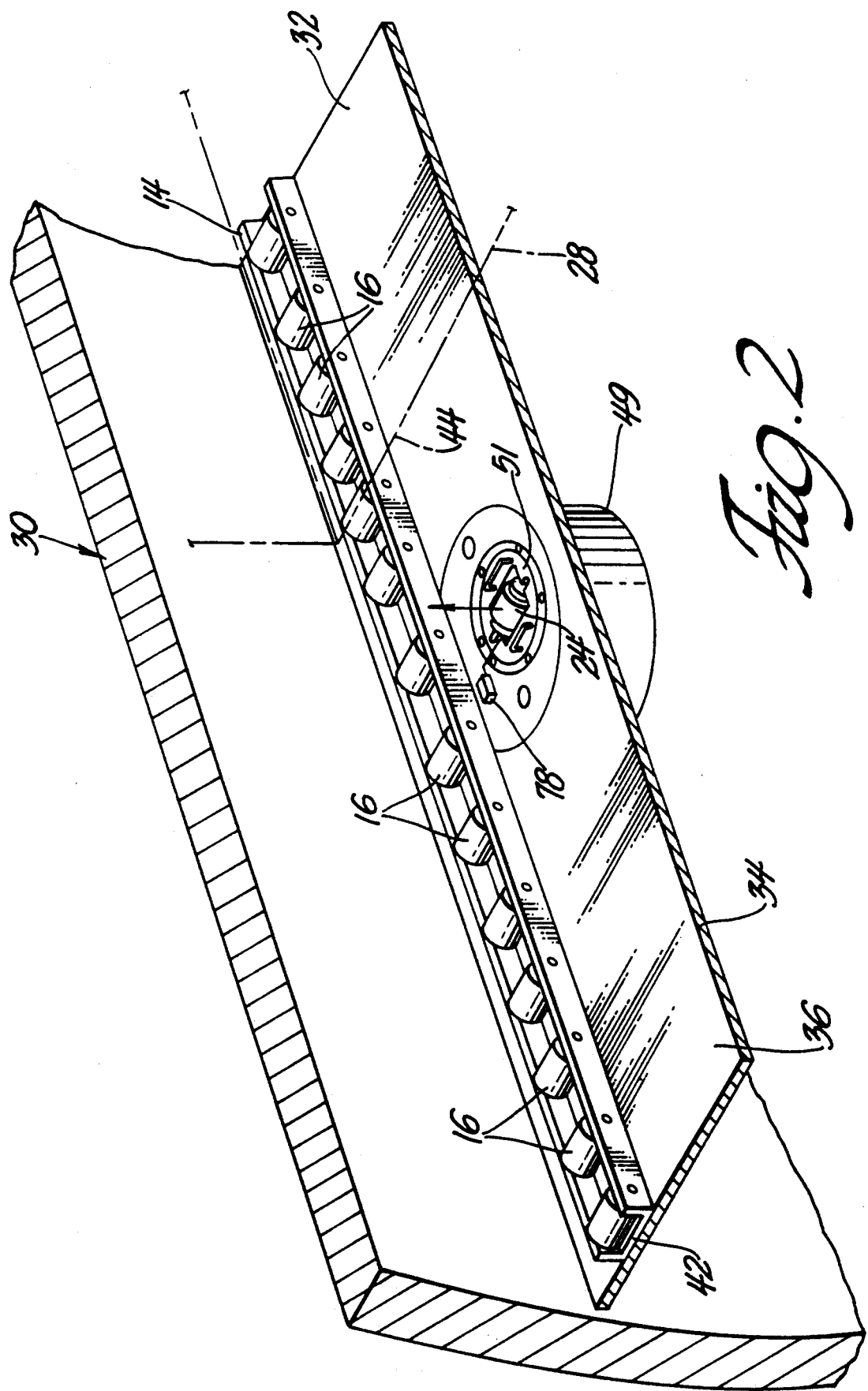
FIG. 2 is an enlarged fragmentary respective view of the drive means of the subject invention.

A fragmented perspective view of an aircraft fuselage is shown in FIG. 2 including a floor structure 32 extending horizontally from the fuselage. The floor structure 32 includes a sheet-like top layer 34 having an upper surface 36.

The plurality of free conveyor rollers 16 supported for free rotation in a U-shaped channel 42. The pallet, shown in phantom, includes a lower surface 44 which iu supported on the conveyor rollers 16. The powered drive rollers 24 are disposed to rollably engage the lower surface 44 of the pallet 28 and to urge the pallet 28 along the conveyor trays 14, to establish a conveyor path. Usually, at least two placed parallel tracks of conveyor trays 14 are employed to support the pallet 28, with the drive rollers 24 disposed in regularly spaced intervals between the two tracks of the conveyor trays 14. The structure is similar for the lateral drive means 50, except that omni-directional free rollers 20 are utilized, as commonly known in the art.

As best seen in FIG. 1, the cargo area of the aircraft 30 is sectioned into a first or right side 46 and a second or left side 48 for moving pallets 28 independently down each side 46, 48. When smaller pallets 28 are utilized, both the right 46 and left 48 sides may independently convey the pallets 28. Both sides 46, 48 or only one side 46, 48 may be powered to move pallets 28. However, when a large pallet 28 is utilized which covers both sides 46, 48 of the aircraft 30, both the right and left sides 46, 48 are utilized and rollers 24, 26 on both sides 46, 48 are powered. As is illustrated, the powered rollers 24, 26 are spaced such that at least one roller 24, 26 will contact each pallet 28.

The door area 22 allows loading and unloading of the pallets 28 into and out of the cargo area of the aircraft 30. The plurality of laterally extending omni-directional rollers 20 and powered lateral rollers 26 extend laterally in the door area 22 along axis B and aid in the movement of the pallets 28 into and out of the aircraft and to the top of the right 46 or left 48 sides. Located adjacent thereto and longitudinally down each side of the aircraft parallel with axis A are the longitudinal extending free rollers 16 and the powered longitudinal rollers 24 for moving the pallets 28 along axis A. Therefore, the powered lateral drive rollers 26 move a pallet 28 into the aircraft 30 to the right side 46, left side 48 or both sides 46, 48, and thereafter the powered longitudinal drive rollers 24 move the pallet 28 further into the cargo area for loading; vice versa for unloading.

The powered drive rollers 24, 26 may be of the type disclosed in U.S. patent application Ser. No. 648,028, now abandoned, filed Jan. 30, 1991 assigned to the assignee of the subject invention, or may be of any other type of roller as commonly known in the art.

Figure 3:
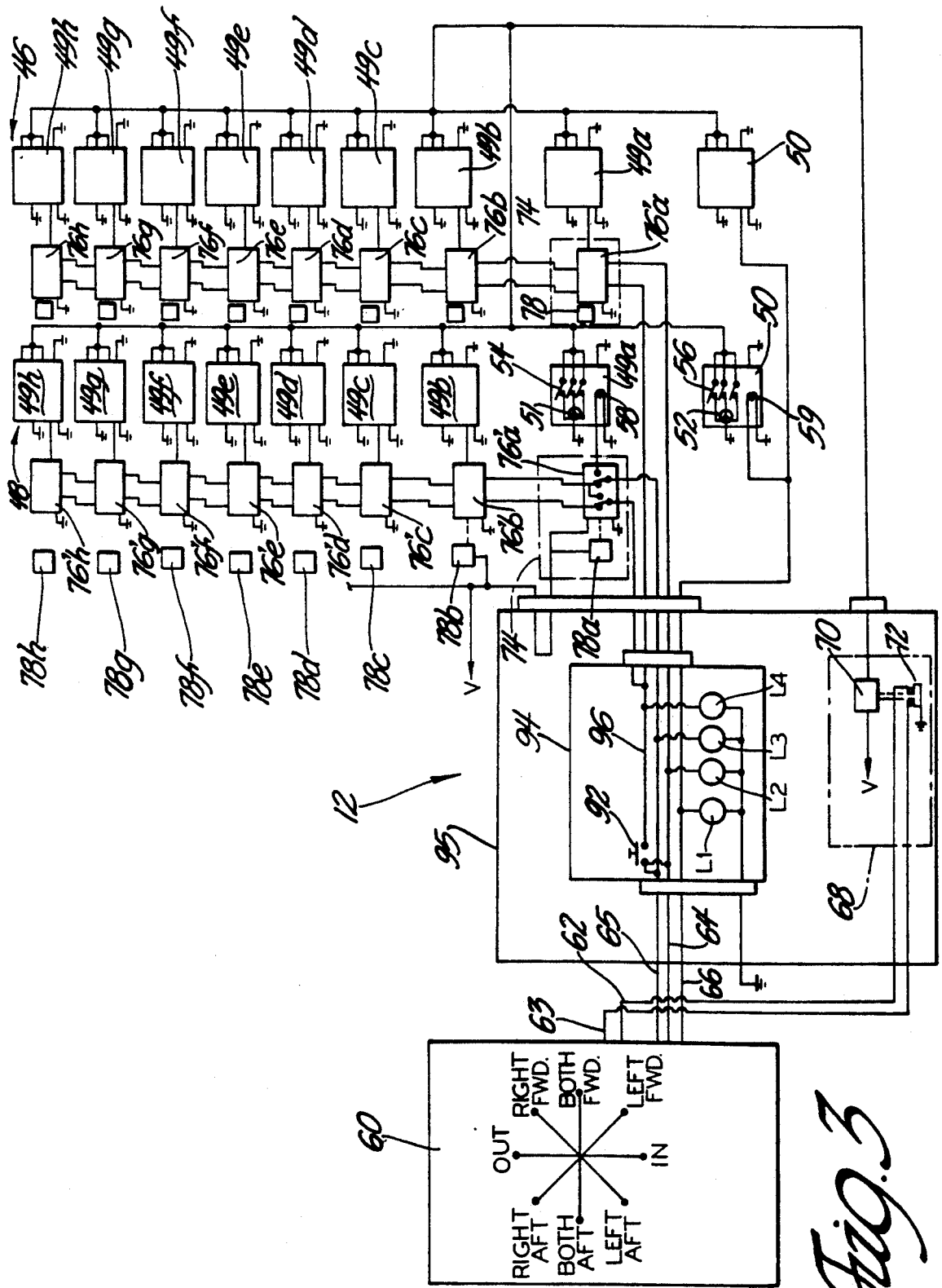
FIG. 3 is a schematic diagram of the control means of the subject invention.

As best illustrated in FIG. 3, all of the respective drive means 49, 50 also include a motor 51, 52, power switch 54, 56 and relay 58, 59 to operate each powered drive roller 24, 26. Only one example of each drive means 49, 50 is illustrated; all are configured the same. The motor 51, 52 is operatively connected to the roller 24, 26. Upon powering of the motor 51, 52, the roller 24, 26 is vertically raised to contact the lower surface 44 of the pallet 28, and upon discontinuing of the power, the roller 24, 26 is retracted to avoid contact with the pallet 28. This is further described by the aforementioned patent application Ser. No. 07/648,028, now abandoned, and is incorporated by reference herein. The power switch 54, 56 interconnects the motor 51, 52 and a power signal for opening and closing to discontinue and supply power to the motor, respectively. The relay 58, 59 is operatively connected to and controls the power switch 54, 56 for controlling the opening and closing thereof in response to a drive signal, as subsequently explained.

The conveyor assembly 10 includes control means 12 operatively connected to the plurality of longitudinal drive 49 means for limiting power only to the drive means 49 adjacent the pallet 38 to be moved while preventing power to the drive means 49 not adjacent and moving the pallet 28. In other words, to limit power utilized by the plurality of longitudinal drive means 49, the control means 10 allows only the drive means 49 moving and underneath each pallet 28 to be powered. All drive means 49 which are not adjacent and able to contact a pallet 28 are unpowered therefore conserving power. The control means 12 is also connected to and controls the lateral drive means 50.

The control means 12 includes manual actuation means 60 for selecting operation of the longitudinal and lateral drive means 49, 50. The manual actuation means 60 generally includes a control stick or joy stick having eight positions. The positions of the joy stick 60 including right forward, both forward, left forward, right aft, both aft, left aft, in, and out. The in and out positions are used for the lateral drive means 50 moving pallets 28 along the lateral axis B. The two drive means 50 are all on or all off, and all rotate in the same direction to move the pallet 28 in or out. The remaining positions are utilized for controlling the longitudinal drive means 49 along the axis A. The joy stick 60 produces direction signals comprising a forward or out signal 62 and aft or in signal 63 in response to the joy stick 60 movement between the forward, aft, in and out positions, a side signal comprising a right or first side signal 64 and a left or second side signal in response to the joy stick 60 moving between the right, both and left selections, and a lateral signal 66 which is produced in response to the joy stick 60 moving to the in or out position. The joy stick 60 is commonly known in the art, and in this particular embodiment may be a Boeing joy stick controller. The joy stick 60 produces two or three signals simultaneously depending on the position thereof. The right or left signals 64, 65 or both signals may be produced in combination with the direction signal 62, 63 indicating forward or aft signal, and the lateral signal 66 is produced simultaneously with the direction signal 62, 63 indicating in or out. For example, when the joy stick 60 is moved to the right forward position, the right signal 64 and forward signal 62 are produced. When the both aft position is selected, the right 64 and left 65 signals are produced along with the aft signal 63.

The control means 12 includes power means 68 responsive to the direction signals 62, 63 for supplying a power signal to the drive means 49, 50 in either the forward or reverse (out or in relating to lateral movement) directions. The power means 68 is commonly known in the art and includes reversing contact comprising a mechanism interlock dual coil relay assembly 70 for receiving 115 volt 400 cycle power and supplying ac power to power the drive means 49, 50 in the forward and reverse (out or in) directions. A toggle relay 72 receives the direction signals from the joy stick 60 to control the direction of power and therefore direction of the motors 51, 52.

The control means 12 includes limiting means 74 operatively connected to the longitudinal drive means 49 for sensing the presence of the pallet 28 at the drive means 49 to provide power thereto and for preventing powering of the drive means 49 in the absence of sensing the presence of a pallet 28. The limiting means 74 comprises a switch means 76, 76', 76" for powering a predetermined number of drive means 49 adjacent and moving a predetermined number of pallets 28 in response to a switch signal and for automatically discontinuing power to at least one of the power drive means 49 in response to an additional pallet 28 being placed adjacent an unpowered drive means 51. The limiting means 74 also includes sensor means 78 associated with each of the plurality of longitudinal drive means 49 for sensing the presence of the pallet 28 at the associated drive means 49 to produce the switch signal. The switch means 76, 76', 76" comprises a sensor switch associated with each of the plurality of drive means 49 wherein the sensor switches 76, 76', 76" on the right side 46 are connected in series with one another, and the sensor switches 76, 76', 76" the left side 48 are connected in series with one another.

Figure 4:
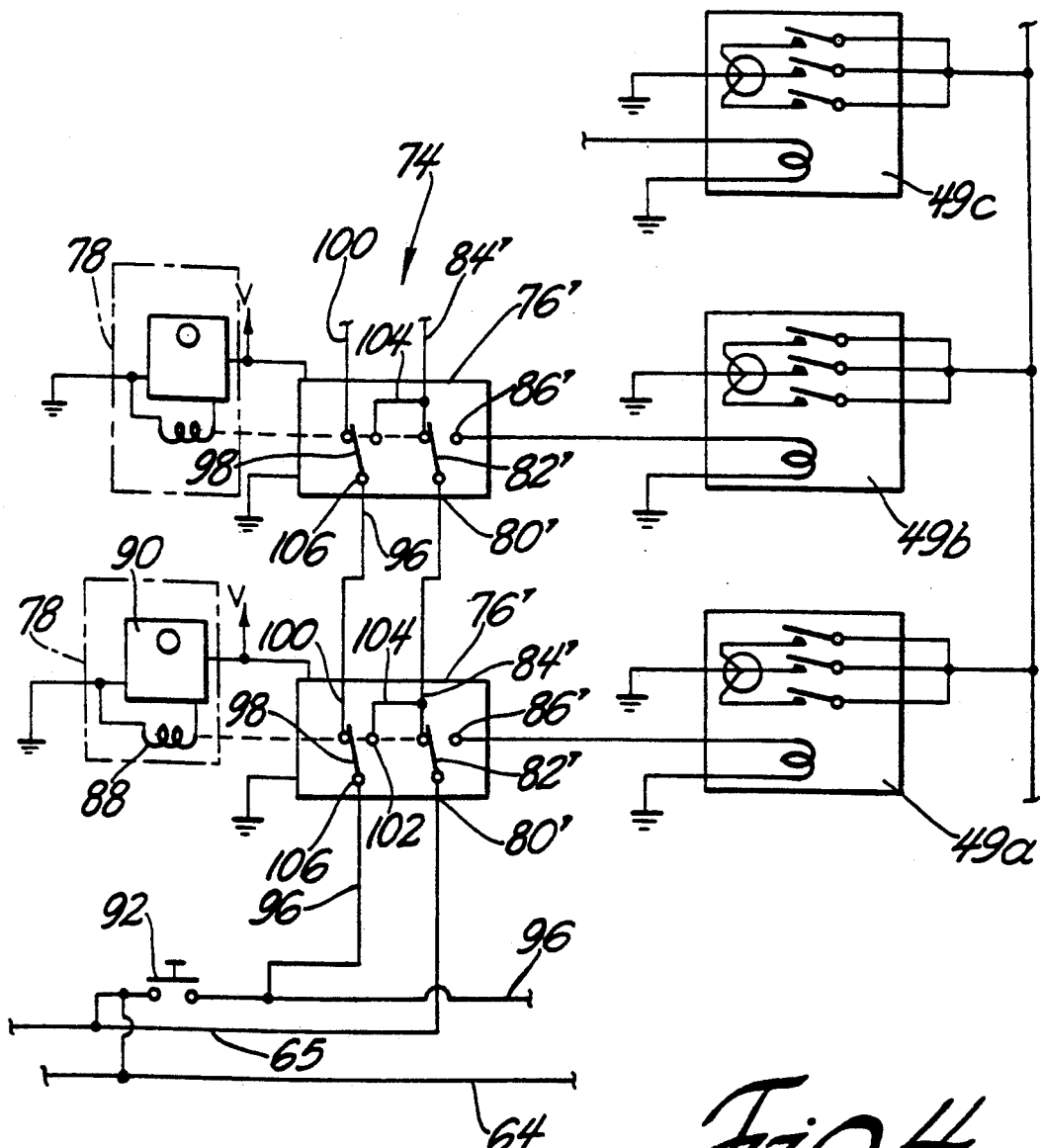
FIG. 4 is an enlarged detailed view of the limiting means in FIG. 3.

The sensor means 78 is illustrated in FIG. 4 with the switch means 76' and includes a sensor relay 88 for controlling the contact arm 82. The relay 88 is connected to a sensor 90. The sensor 90 may be an infrared sensor contact sensor, etc. The associated drive means 49 will only be powered upon the associated sensor 90 sensing a pallet 90 thereabove on the free rollers. Otherwise, no power will be supplied to the drive means 49 by lack of the relay 58 being energized.

The sensor switch 76, 76', 76" may be a single contact switch 76 (FIG. 5) which moves between two positions allowing one longitudinal drive means 49 on a side 46, 48 to be powered at a time, or may include a double pole double throw switch 76' (FIGS. 3 and 4) allowing one or two drive means 49 on a side to operate at a time, or a multi-pole switch 76" (FIG. 6) allowing two or three drive means 49 on a side 46, 48 to operate at a time.

Each sensor switch 76, 76', 76" has an input 80 connected to the respective side signal 64, 65 to contact a contact arm 82 switching between a series output 84 providing the respective side signal to a subsequent sensor switch 76, 76', 76" in the series, and a drive output 86 to provide a drive signal to the respective relay 58 of the drive means 49. The contact arm 82 is controlled by the sensor means 78.

In regard to a single switch operation 76 (FIG. 5), the switch contact arm 82 is normally in the position contacting the series output 84. Each series output 84 of a previous switch 76 is connected to the input 80 of the next successive switch 76 in the series on a side. As can be clearly seen, upon the first switch contact moving the contact arm 82 to the drive output 86, the respective side signal 64, 65 will be cut off from the next successive switch 76, etc. Therefore, only one drive means 49 will be powered at a time. In this position, a drive signal is produced to the relay 58 of the drive means 49 to close the power switch 54 to power the motor 51.

In regard to the lateral drive means 50, the lateral signal is directly connected to each relay 59 of each drive means 50 so that upon movement of the joy stick 60 to the appropriate position the motors 52 will be immediately powered.

Figure 5:
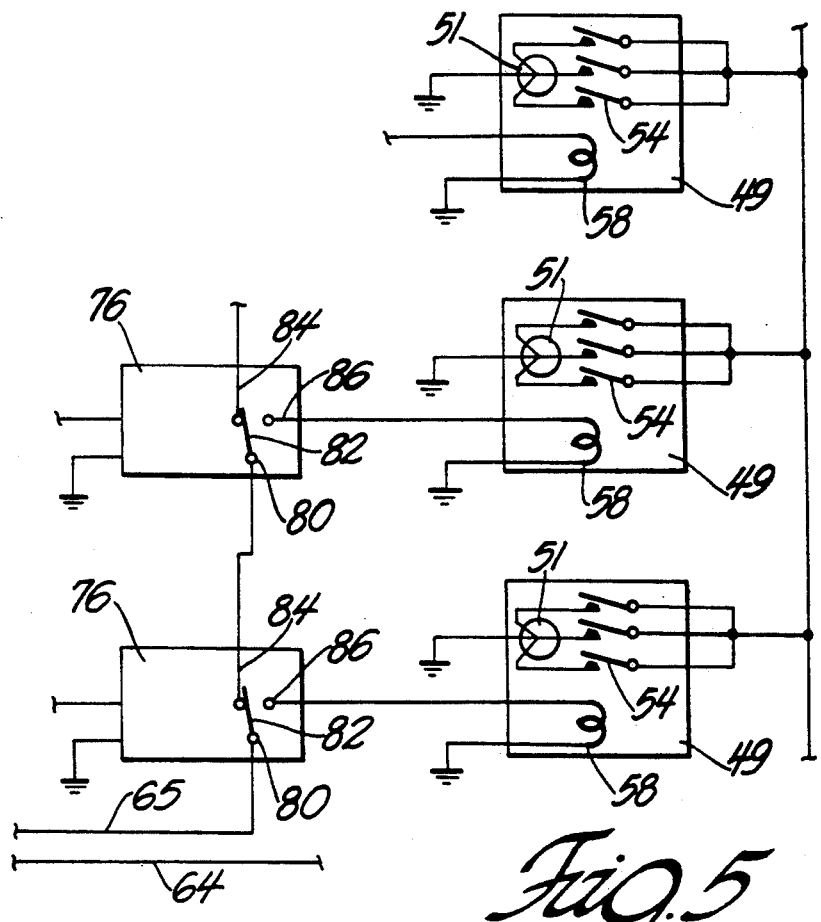
FIG. 5 is a second alternative embodiment of the switch.
Figure 6:
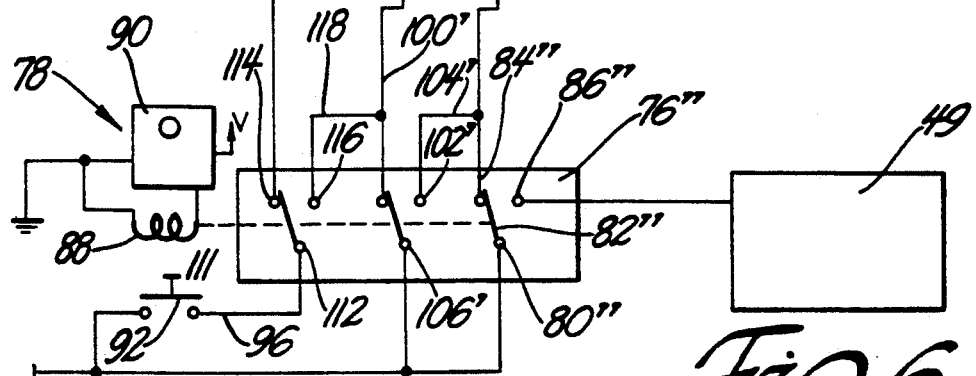
FIG. 6 is a third alternative embodiment of the switch shown with the sensor.

The control means 12 includes selection means 92 connected in parallel with the side signals 64, 65 for manual operation thereof to increase the predetermined number of longitudinal drive means 49 able to be powered concurrently when using the second 76' or third 76" switch embodiments. The selection means 92 comprises a momentary push button switch. In other words, if the double pole double throw switch 76' is utilized, actuation of the selection switch 92 will allow the respective side signal to be sent to two drive means 49 on a side 46, 48. FIG. 3 illustrates this 1-2 operation, wherein the normal operation is to allow one drive means 49 to operate. Upon depression of the selection switch 92, two drives means 51 are allowed to operate in a series on one side. FIG. 5 illustrates a single switch 76 utilized wherein only one drive means 49 may operate in a series. FIG. 6 illustrates the use of multi-switches 76" which allows 2-3 operation wherein two drive means 49 operate in the normal operation, wherein upon actuation of a selection switch 92, three drive means 49 on a side may be operated upon sensing of a pallet 28 thereover.

FIG. 3 illustrates the specific circuitry of the control means 12 and drive means 49, 50. Merely as example, the double pole double throw switch 76' is utilized in this schematic. However, it is to be understood that the switches 76, 76" illustrated in FIGS. 5 and 6 may be substituted into the schematic depending upon the desired operation. As illustrated in FIG. 3, the joy stick 60 produces five output signals: aft/in signal 63, forward/out signal 62, right signal 64, left 65, and lateral signal 66. The joy stick 60 may be of the type used in Boeing aircraft as the cargo joy stick control box, commonly known in the art. These five signals 62–66 are transmitted to a standard Boeing power and relay equipment panel 95, as commonly known in the art. The power means 68 is included in the panel 95 and receives the aft/in signal 63 and the forward/out signal 62. The power means 68 by way of the toggle relay 72 and assembly 70 supply the power signal to each drive means 49, 50 in the direction as indicated by the received direction signals 62, 63.

The selection switch 92 provides an additional terminal to a successive drive means 49 upon depression thereof producing a pallet select signal 96. This has been added to the box 94 by the inventor herein. The pallet select signal 96 is equivalent to the side signal.

The outputs produced from control box 94 include lateral signal 66, right signal 64, left signal 65, pallet select signal 96, and power signal, each having been inductively coupled to ground by inductors L1-L4. The power signal is transmitted to each power switch 54, 56 of each drive means 49, 50. The lateral signal 66 is transmitted directly to the two lateral drive motors 52. The lateral signal 66 directly powers the power relay 59 which closes the power switch 56 to supply three phase power to the motor 52 for operating the rollers 18. The left 65 and right 64 signals and pallet select 96 signal are sent to the respective switch means 76'. In FIG. 3, only one switch 76' is indicated it being understood that all switches 76' are configured the same on each side 46, 48. FIG. 4 clearly indicates the switch connections. In the instant embodiment, the side signals 64, 65 are sent to the input 80' which is connected to the moveable contact arm 82'. The movable contact arm 82' is in its normally closed position contacting the series output 84' for supplying the signal to the next successive switch 76' associated with a successive drive means 49. The second position of the movable contact arm 82' contacts the drive output 86' to, in turn, power the power relay 58. A second moveable contact arm 98 is connected to the second input 106 to the pallet select signal 96 in the normal position to provide the signal to a second series output 100 a successive switch 76'. A second drive output 102 of the moveable contact arm 98 connects to a lead 104 which is connected to the series output 84' from the first moveable contact arm 82' to produce the signal simulating a side signal to the successive switch 76'. The switch 76' is operated by the sensor relay 88 controlled by the sensor 90. In the preferred embodiment, the sensor 90 is an infrared sensor which upon sensing a reflected beam from the pallet 28, activates the sensor relay 88 to actuate the switch 76'. The sensor may be of the type BANNER N05-Q08-AP7 DIFFUSE PROXIMITY SENSOR. Other types of sensors may be utilized, such as mechanical, electrical, contact, etc.

With regard to the multi-pole switch 76" in FIG. 6, the switch 76" is similar to the double pole double throw switch 76' except that an additional contact arm 111 is added. Similar reference numerals indicate similar components. The second input 106' is now connected directly to the respective side signal 64, 65, and a third input 112 is connected to the pallet signal 96 and to the third contact arm 111. The contact arm 111 is in the normal position contacting a third series output 114, and may be moved to a third drive output 116. The third drive output 116 is connected by lead 118 to the second series output 100'. Therefore, three drive means 49 in a series may be operated concurrently. When the relay 88 is energized, all contact arms 82, 106, 111 move out of the normal positions against outputs 84, 100, 114 (depending on the switch embodiment 76, 76', 76") to contact the outputs 86, 102, 116).

In operation, a first pallet 28 is loaded onto the aircraft 30 and the joy stick 60 is moved to the in position In response thereto, the aft/in signal 63 and the lateral signal 66 are produced. The aft/in signal is communicated to the power means 68 which in turn produces a three phase power to each drive means 49, 50. The lateral signal is directly connected to the two lateral drive means 50 to power the power relays 59 to in turn close the power switches 56 to power the motors 52. Upon movement of the joy stick 60 out of the in position, the lateral signal 66 will be discontinued and the power switches 56 will open discontinuing power to the lateral motor 52 and stopping movement of the pallet 28. Assuming the pallet 28 is a size to fit on one of the left or right sides 46, 48, the pallet 28 is moved by the lateral drive means 50, for example, to the left side 48. Thereafter the joy stick 60 may be moved to the left aft position which produces the aft/in signal 63 and the left signal 65. Assuming the pallet selection switch 92 is not depressed, the left signal 65 is supplied to the input 80' of the first switch means 76'. The aft/in signal is transmitted to the power means 68 to supply power to the drive means 49, 50 in the appropriate direction. The pallet 28 is initially over the first drive means 49a and sensor 78a and is forced longitudinally down the aircraft until it reaches the second successive drive means 49b. Until the pallet 28 has left the first drive means 49a and removed from above the sensor 78a, the second drive means 49b will not be powered. Upon the first sensor 78a not sensing the pallet 28 thereover, power to the associated drive means 49a will be discontinued which stops and retracts the roller 24. Upon the second drive means 49b sensing that the pallet 28 is thereover and upon receiving the left side signal 65 at input 80, the longitudinal motor 51b associated therewith is powered. This occurs successively as the pallet 28 moves successively down the aircraft 30 and over each drive means 49a–h. When the pallet 28 arrives at its latching position i.e., drive means 49h, the joy stick 60 is removed from the left aft position and the pallet 28 is latched. A new pallet 28 is entered by moving the joy stick 60 to the in position to operate the lateral drive means 50. This will also discontinue power to all the longitudinal drive means 49. Upon completion of moving the pallet 28 into the cargo area, the joy stick 60 is moved to the left aft position wherein the first drive means 49a will be powered disallowing power to the last drive means 49h which has the first pallet 28 thereover. The same sequence of steps occurs whether the pallet 28 is entered on the right or left side 46, 48.

If the pallet selection switch 92 is depressed, two successive pallets 28 (or three successive pallets in the third embodiment 76") may be conveyed down each side of the aircraft (depending on joy stick 60 selection) along the longitudinal axis A at a time. For example, upon a single pallet 28 having entered using a lateral drive means 50, the joy stick 60 is again moved to the right aft position wherein the first drive means 49a powers to move the pallet 28. When the pallet reaches the second drive means 49b and leaves the first drive means 49a, the first drive means 49a will be unpowered. At this point, if the joy stick 60 is moved back to the in position, power will be discontinued to the drive means 49 under the loaded pallet 28. A second pallet 28 is entered into the system using the lateral drive means 50 to the left side wherein the first pallet 28 is located over the second drive means 49b. The joy stick 60 is thereafter moved to the right aft position. Thereupon, power will be applied to the first drive means 49a only. Upon depression of the pallet selection switch 92, the pallet select signal 96 will be energized to supply the left side signal 65 to the second contact arm 98 of the switch 76'. Presumably, the second pallet 28 is located over the first drive means 49a causing the switch 76' to be activated to power the motor 51. The second contact arm 98 will provide the side signal to the next successive drive means 49b. Upon sensing of the first pallet 28 at the drive means 49b, the contact arm of the switch 76b' will be moved to power the associated motor 51. As can be understood, the pallets 28 need not be located one right after another, but may be spaced apart with several unpowered drive means 49 therebetween. If a third pallet 28 is entered on the same side, power to the first pallet 28 is discontinued.

Furthermore, if the third embodiment switch 76" is used, the normal operating condition is as with switch 76' when the selection switch 92 activated. However, when the selection switch 92 is activated, three drive means 49 may be operated on a side.

If the joy stick 60 is moved to the both aft position, both the right 46 and left 48 sides will be operated and may move independent pallets 28 theredown. In the alternative, if a pallet 28 extends across the entire width of the cargo area, both sides 46, 48 will move the one pallet 28 down the aircraft with the joy stick 60 in the aft position. The pallet selection switch 92 may also be utilized to power several drive means 49 on each side 46, 48.

Additionally, to operate in the reverse and out positions, the system acts as "first-in-last out". The reverse and out positions change the direction of the drive means 49, and operation is thereafter similar to the above-described.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. An aircraft conveyor assembly for controlling movement of a plurality of objects (28) through an aircraft, said conveyor assembly comprising:

a plurality of drive means (49) connected in series and spaced along the aircraft for receiving power to contact and move the objects (28), said conveyor assembly characterized by including control means (12) operatively connected to said plurality of drive means (49) for powering said drive means (49) adjacent the objects (28) to be moved while preventing power to the remaining derive means (49) not adjacent and moving the object (28), said control means including limiting means (74) connected to said drive means (49) for sensing the presence of an object (28) at said drive means (49) to provide power thereto and for preventing power to said drive means (49) in the absence of an object (28), and for allowing a limited number of drive means (49) to be powered to allow an additional drive means (49) in excess of the limited number to be powered only when one of said powered drive means becomes unpowered.

2. An assembly as set forth in claim 1 wherein said switch means (76) comprises a switch having a contact arm (82) switching between a series output (84) providing a signal to a successive switch (76) and a drive output (86) to provide a drive signal to said drive means (49).

3. An assembly as set forth in claim 1 wherein said limiting means (74) includes switch means (76, 76', 76") for powering a predetermined number of drive means (49) adjacent and moving a predetermined number of objects (28) in response to a switch signal and for automatically discontinuing power to at least one of said powered drive means (49) in response to an additional object (28) being placed and sensed adjacent an additional and unpowered drive means (49) with no object (28) thereover.

4. An assembly as set forth in claim 1, wherein said limiting means (74) includes sensor means (78) associated with each of said plurality of drive means (49) for sensing the presence of the object (28) at said associated drive means (49) to produce said switch signal.

5. An assembly as set forth in claim 4 wherein said control means (12) includes manual actuation means (60) for selecting operation of said drive means (49) for producing direction signal (62, 63) indicative of forward or reverse operation, a side signal (64, 65), and a lateral signal (66).

6. An assembly as set forth in claim 5 wherein said control means (12) includes power means (68) responsive to said direction signal for supplying a power signal to said drive means (49) in either the forward or reverse directions.

7. An assembly as set forth in claim 6 wherein said switch means (76, 76', 76") comprises a switch associated with each of said plurality of drive means (49) wherein said switches (76, 76', 76") are connected in series, said switches (76, 76', 76") each having an input (80) connected to said side signal and to a contact arm (82) switching between a series output (84) providing said side signal to a successive switch (76, 76', 76") in said series and a drive output (86) to provide a drive signal to said associated drive means (49), said contact arm (82) responsive to said switch signal.

8. An assembly as set forth in claim 7 wherein said drive means (49) including rotatable drive roller (14), a motor (51) operatively connected to said drive roller (14) for rotating same in response to a power signal, power switch means (54) interconnecting said motor (51) and said power signal for opening and closing to discontinue and supply power to said motor (50), respectively.

9. An assembly as set forth in claim 8 wherein said drive means (49) includes relay means (58) operatively connected to said power switch means (54) for controlling said opening and closing thereof in response to said drive signal.

10. An assembly as set forth in claim 7 wherein said control means includes selection means (92) connected in parallel with said side signal for manual operation thereof to increase the predetermined number of drive units able to be powered concurrently.

11. An assembly as set forth in claim 1 wherein said switch means (76') comprises a double pole double through switch for allowing power to either one drive means (49) or alternatively to two drive means (49).

12. An assembly as set forth in claim 1 wherein said switch means (76") comprises a switch for powering either two drive means (49) or in the alternative three drive means (49).

13. An assembly as set forth in claim 1 wherein said control means includes selection means (92) connected in parallel with said side signal for manual operation thereof to increase the predetermined number of drive units able to be powered concurrently.

14. An aircraft conveyor assembly for controlling movement of a plurality of objects (28) through an aircraft, said conveyor assembly comprising:

a plurality of drive means (49) spaced longitudinally along the aircraft (30) for receiving power to contact and move the objects (28) longitudinally therealong, control means (12) operatively connected to said drive means (49) for powering a predetermined number drive means (49) adjacent and moving a predetermined number of objects (28) and for automatically discontinuing power to at least one of said powered drive means in response to an additional object (28) being placed and sensed adjacent an additional and unpowered drive means (49) with no other object (28) thereover.

15. An assembly as set forth in claim 14 wherein said control means includes limiting means (74) connected to said drive means (49) for sensing the presence of an object (28) at said drive means (49) to provide power thereto and for preventing power to said drive means (49) in the absence of an object (28).

16. An assembly as set forth in claim 15 wherein said limiting means (74) includes switch means (76, 76', 76") for powering a predetermined number of drive means (49) adjacent and moving a predetermining number of objects (28) in response to a switch signal and for automatically discontinuing power to at least one of said powered drive means (49) in response to an additional object (28) being placed and sensed adjacent an additional and unpowered drive means (49) having no other object (28) thereover.

17. An assembly as set forth in claim 16 wherein said limiting means (74) includes sensor means (78) associated with each of said plurality of drive means (49) for sensing the presence of the object (28) at said associated drive means (49) to produce said switch signal.

18. An assembly as set forth in claim 17 wherein said control means (12) includes manual actuation means (60) for selecting operation of said drive means (49) for producing direction signal (62, 63) indicative of forward or reverse operation, a side signal (64, 65), and a lateral signal (66).

19. An assembly as set forth in claim 18 wherein said switch means (76, 76', 76") comprises a switch associated with each of said plurality of drive means (49) wherein said switches (76, 76', 76") are connected in series, said switches (76, 76', 76") each having an input (80) connected to said side signal and to a contact arm (82) switching between a series output (84) providing said side signal to a successive switch (76, 76', 76") in said series and a drive output (86) to provide a drive signal to said associated drive means (49), said contact arm (82) responsive to said switch signal.

20. A method for controlling movement of a plurality of objects (28) through an aircraft (30) utilizing drive means (49), the method comprising the steps of:

sensing the presence of objects (28) at one of the drive means (49), supplying power to the drive means associated with the object (28), preventing power to the remaining drive means (49) not adjacent and moving the object (28);

limiting the number of drive means (49) able to be powered to allow a subsequent drive means (49) in excess of the limited number to be powered only when one of said powered drive means (49) is unpowered.

21. A method as set forth in claim 20 further including powering a predetermined number of drive means (49) adjacent and moving a predetermined number of objects (28) in response to a switch signal and automatically discontinuing power to at least one of the power drive means (49) in response to an additional object (28) being placed and sensed adjacent an additional unpowered drive means (49) having no other object (28) thereover.

22. A method a set forth in claim 21 further including producing a switch signal upon sensing the presence of an object (28).

23. A method as set forth in claim 22 further including selecting operation of the drive means (49) for producing a directional signal (62, 63) indicative of forward and reverse direction, a side signal (64, 65), and a lateral signal (66).

24. A method as set forth in claim 23 further including manually increasing a predetermined number of drive units able to be powered concurrently.

25. A method for controlling movement of the plurality of objects (28) through an aircraft (30) by operation of a plurality of drive means (49) the method including the steps of:

powering a predetermined number of drive means (49) adjacent and moving a predetermined number of objects (28), automatically discontinuing power to at least one of the power drive means (49) in response to an additional object (28) being placed adjacent an additional and unpowered drive means (49) having no object (28) thereover.

26. An aircraft conveyor assembly for controlling movement of a plurality of objects (28) through an aircraft, said conveyor assembly comprising:

a plurality of drive means (49) connected in series and spaced along the aircraft for receiving power to contact and move the object (28), control means (12) operatively connected to said plurality of drive means (49) for powering said drive means (49) adjacent the objects (28) to be moved while preventing power to the remaining drive means (49) not adjacent and moving the object (28);

said control means includes a plurality of limiting means (74) connected at each one of said plurality of drive means (49) each for receiving power and for detecting the presence of an object (28) at said drive means (49) to automatically provide power to the associated drive means (49) upon receiving power and sensing the presence of the object (28) independent of the other limiting means and to discontinue power to said drive means (49) in the absence of an object (28) or absence of receiving power; and each of said limiting means (74) includes switch means (76, 76', 76") each connected in series with one another for powering a predetermined number of drive means (49) adjacent and moving a predetermined number of objects (28) and for automatically discontinuing power to at least one of said powered drive means (49) in response to an additional object (28) being placed and sensed adjacent an unpowered drive means.

27. An assembly as set forth in claim 26 wherein said switch means comprises at least one switch connected in series with adjacent subsequent and prior switches for receiving power and opening in response detecting an object at the associated drive means (49) preventing power to the subsequent and adjacent switch, and closing in response to absence of an object allowing power to be supplied to the subsequent switch.

28. An assembly as set forth in claim 26 wherein said limiting means (74) includes switch means connected in series of receiving power and for preventing power to at least one other switch means when an object is detected and the associated drive means (49) is powered.

* * * * *